United States Patent [19]

Toader et al.

[11] Patent Number: 5,749,075
[45] Date of Patent: May 5, 1998

[54] METHOD FOR PROVIDING PREPAID INTERNET ACCESS AND/OR LONG DISTANCE CALLING INCLUDING THE DISTRIBUTION OF SPECIALIZED CALLING CARDS

[75] Inventors: Adrian Toader, Overland Park; Jose Valdez, Olathe, both of Kans.

[73] Assignee: Interactive Media Works, L.L.C., Overland Park, Kans.

[21] Appl. No.: 579,881

[22] Filed: Dec. 28, 1995

Related U.S. Application Data

[63] Continuation-in-part of Ser. No. 471,337, Jun. 6, 1995.
[51] Int. Cl.$^6$ .................................................. G06F 17/60
[52] U.S. Cl. ........................................................ 705/14
[58] Field of Search ................................ 705/14; 379/36, 379/90.01, 93.01, 93.13, 93.22

[56] References Cited

PUBLICATIONS

Anonymous, "John Malone Discusses the Future of the Communications Industry", Local Telecom Competition News, Feb. 16, 1994.

Rizzo, John, "Groupware meets Netware", MacUser, May, 1995.

O'Hearen, "Pre-Paid Calling Cards, Ringing up Big Incentive Sales", Incentive Marketing, Nov. 1995.

*Primary Examiner*—Emanuel T. Voeltz
*Assistant Examiner*—Barton L. Bainbridge
*Attorney, Agent, or Firm*—Litman, McMahon & Brown L.L.C.

[57] ABSTRACT

A method for providing prepaid Internet Access and/or long distance including the distribution of specialized calling cards, each with a unique PIN number associated therewith. Each card entitles a recipient to limited access to the Internet, free or low cost Internet access software, and/or time limited long distance calls. The cards can be a sponsor promotion in which the card holder is automatically hotlinked into the sponsor's Internet home page where he or she is given a "guided tour". An "Enhanced Entry Server" (EES), verifies the PIN number, provides the Internet and/or long distance access and times the sponsor paid Internet access or calling time.

21 Claims, 2 Drawing Sheets

METHOD FOR PROVIDING PREPAID INTERNET ACCESS AND/OR LONG DISTANCE CALLING INCLUDING THE DISTRIBUTION OF SPECIALIZED CALLING CARDS

CROSS REFERENCE TO RELATED APPLICATIONS

This application is a continuation-in-part of application Ser. No. 08/471,337 for METHOD FOR PROVIDING SPONSOR PAID INTERNET ACCESS AND SIMULTANEOUS SPONSOR PROMOTION, filed Jun. 6, 1995.

BACKGROUND OF THE INVENTION

1. Field of The Invention

The present invention relates to a method for providing sponsor prepaid or consumer paid internet access and/or long distance calling. In the event of a sponsor paid promotion, distribution is made to a user, such as a consumer of the sponsor's products or services, for example. More particularly, the method includes the distribution of specialized calling cards. A toll free telephone number is distributed along with the calling cards which number can be called to connect to an Enhanced Entry Server to order free or low cost software for accessing the Internet. For sponsor promotions, the Internet access software is designed such that, as the user initially accesses the Internet, the sponsor's "home page" and domain is automatically accessed as well. The specialized calling card can be used for Internet access time, for long distance calling time, or for any combination of Internet time and calling time.

2. Description of The Related Art

In marketing of consumer products, particularly in the United States, it has long been common for manufacturers to use promotions in the form of discount coupons, sweepstakes, or other giveaways and contests. One object of such promotions is to develop a customer profile database which can yield valuable marketing information. Another object is to develop consumer mailing lists to identify customers who would be prime targets for promotional materials.

Traditionally, mail-in rebates have been one method of choice for developing such survey information and mailing lists. Such rebates are traditionally distributed by attaching refund offers directly to the product, or to display them alongside the product on a retail shelf, which refunds can be mailed into the manufacturer, along with a proof of purchase, to get a refund or rebate on the product. Some retail merchants provide a central bulletin board where all of the rebate forms are placed, requiring interested consumers to look through all of the forms to locate the one or ones in which they are interested. In addition to this time consuming search for relevant refund offers, there are several additional disadvantages of this rebate approach. Members of "discount or rebate clubs" will often take an entire booklet of refund forms from a display for trade or sale within the club, thus totally disrupting the manufacturer's promotional scheme. The rebate forms must be printed and distributed by the manufacturers to participating retailers, which represents a significant ongoing cost. Often manufacturers can supply only the largest retailers with refund forms, which diminishes the effectiveness of promotions and information gathering by virtually eliminating small merchants from the marketing effort. Consumers often do not know of the existence of the refund until he or she actually examines the product or the display in the store. Furthermore, since rebates are typically for nominal amounts, such as $0.25 or $0.50, for example, the postage costs to mail in these forms for a rebate are often prohibitive if the consumer is asked to bear them or, if the manufacturer uses prepaid postage, the postage will dramatically increase the promotional costs. The requirement to send in a proof of purchase, typically a store receipt, causes additional inconvenience. Finally, where it is important to collect consumer profile or mailing list information in a set time frame, the rebate coupons are returned to a manufacturer over a period of weeks, if not months. Once received, the information on the forms must be coded in by personnel at the manufacturer's collection facility, representing an added expense.

Recent advances in personal computer technology and the ever increasing percentage of the population with access to a personal computer have made the Internet a viable alternative marketing tool. Many on-line computer services, such as Prodigy and America On-Line, provide, for a fee as a part of their on-line service, software for connecting to and accessing the Internet. There are literally thousands of companies and organizations which maintain Internet/World Wide Web sites or "domains" which are accessible by users of the Internet. A problem with using such Web Sites and associated "Home Pages" as a marketing tool, is the huge number of options available to a user. In other words, without some incentive or direction for a user to access a particular company's home page, there is little likelihood that a particular user will access that home page, or even be aware of its existence.

Recent competition in the long distance carrier market has led to a proliferation of new products and marketing techniques for selling long distance time. One recent innovation is the sale of prepaid telephone calling cards which entitle the bearer to a certain amount of long distance time, typically within the continental United States.

It is apparent that a new marketing strategy and method is needed to take advantage of the Internet to provide a more desirable and convenient method of featuring a company's (sponsor's) products or services while providing a reliable source of consumer profile and mailing list information. Such a method should limit, or even eliminate, the requirement for printing and distributing rebate coupons and should allow sponsors an opportunity to feature, in real time, specific products or services. Such a method should allow the sponsor to target likely recipients for the Internet access at minimal cost. Finally, such a method should provide the potential for continued marketing access to the customers for additional promotions at minimal or no additional cost to the sponsor. Alternatively, an enhanced retail market for telephone calling cards can be creating a specialized calling card with enhanced features.

SUMMARY OF THE INVENTION

The present invention is a method for distributing, by either retail sales, or in a sponsor promotion, a specialized telephone calling card. The calling card includes instructions on getting Internet access software and provides for a certain amount of Internet access time and/or long distance calling time. In the event of a sponsor promotion, the cards are distributed, e.g. by mail or in specially marked packages of the sponsor's products, free or at low cost. For retail sales, the specialized cards are sold at retail outlets or in other standard marketing techniques. In either case, the calling card includes a PIN number along with instructions on dialling a toll free number to either order some free or low cost Internet access software or make a long distance call.

The toll free number connects him or her to an Enhanced Entry Server which can provide either standard long distance calling or a connection to the Internet. Once connected, the consumer is given verbal instructions on selecting either a long distance call or instructions for ordering the free or low cost software. If the option of receiving software is selected, the consumer is polled for name, address, etc., which is then associated with the assigned PIN number. The software, on a floppy disc or CD ROM, is then sent to the consumer along with instructions on installing and using the Internet access software on a personal computer (PC). Alternatively, the software can be directly downloaded to the consumer's PC. Telephone access to the Internet is accomplished by utilizing the Internet access time allocated by the calling card. The Internet access software accesses and "handshakes" with the Enhanced Entry Server, which verifies the PIN number, provides the access and times the user's access time. The Enhanced Entry Server is programmed to recognize the PIN number on the calling card as entitling the user to either a limited prepaid Internet access time and/or a time limited ordinary long distance call within the continental U.S. Typically a long distance time period could be 30 minutes, for example, while the Internet access can be for 1 or 2 hours or even days. If the consumer elects to use the calling card solely for long distance calling and does not order the Internet access software, then no further records are kept, but the calling time is treated as simply a consumer product or a sponsor giveaway. However, if the consumer orders the Internet access software and uses it to dial the Entry server, then the Enhanced Entry Server performs a registration process which includes a number of personal questions. Optionally, for sponsor paid cards, custom data is gathered by the Enhanced Entry Server in the form of queries provided by the sponsor for response by the user. The pertinent answers are then immediately provided to the sponsor. Also in sponsor paid promotions, the Enhanced Entry Server initially gives the user a mandatory "guided tour" of the sponsor's Home Page and domain where the user is exposed to any current product promotion by the sponsor and can download promotional coupons, product information, etc. After this mandatory guided tour is completed, the user is allowed to access other information on the sponsor's home page, and is then released to access any other information on the Internet. The Enhanced Entry Server also tracks the other Internet sites visited by the user during the allotted time period, which information can often provide valuable marketing data. Finally, once the prepaid time period is up, the Enhanced Entry Server prompts the user with one or more of a plurality of options for extending the access period. For example, the user can be prompted to enter a credit card number to which access time will be charged; he or she can be given the opportunity to answer additional survey information in return for additional "free" or prepaid time; or a 900 subscriber paid telephone access number can be provided through which additional access will be billed via the normal telephone company 900 billing cycles.

OBJECTS AND ADVANTAGES OF THE INVENTION

The principle objects and advantages of the invention include: to provide an improved method of retailing a specialized calling card or of featuring a sponsor's products or services by providing a free specialized calling card to a consumer which allows either of a limited Internet access time or ordinary long distance calling; to provide such an improved method in which the recipient of the prepaid calling card is given the option of ordering free or low cost Internet access software for a PC which interfaces the PC with an Enhanced Entry Server to provide access to the Internet; to provide such a method in which a unique PIN number is associated with the prepaid calling card, which PIN number entitles the user to the limited Internet access time and/or calling time; to provide such a method in which the Enhanced Entry Server prompts a user of the Internet access software, upon initial dial-up, to register by answering a series of queries which can include customized survey questions in the event of a sponsor promotion; to provide such a method in which the user, once the queries are answered, is optionally given a mandatory "guided tour" of the sponsor's home page and domain prior to being given general "browsing" access to the Internet; to provide such a method in which any browsing done by the user can also be monitored and reported back to the sponsor for additional marketing information; to provide such a method in which, when the initial allotted time is used up, the user is given one or more options to acquire additional Internet access time; and to provide such a method which achieves effective exposure and marketing of a sponsor's products or services with minimal expense.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
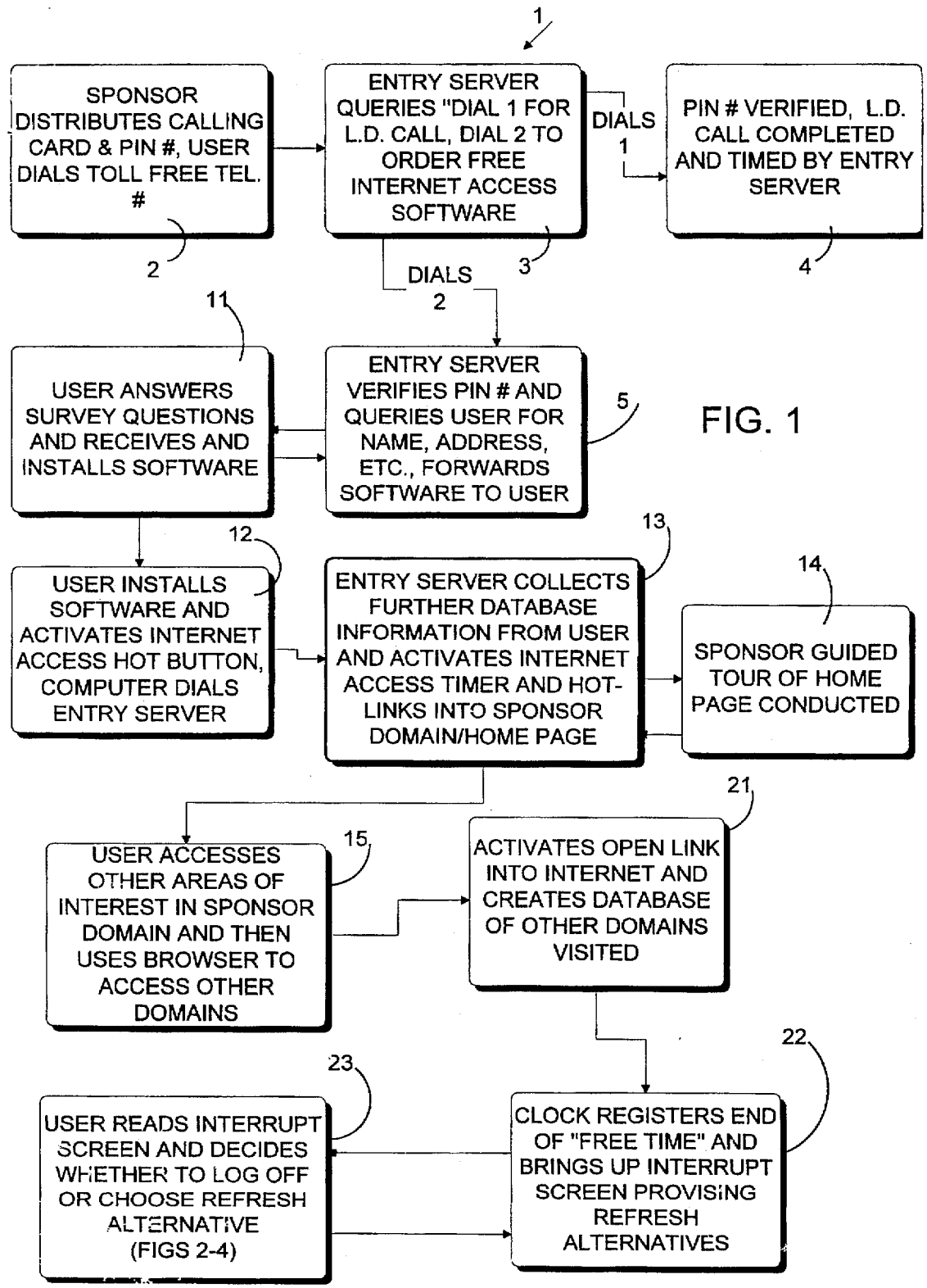
FIG. 1 is a schematic block diagram of a method involving the distribution of specialized calling cards which offer a recipient the option of using the card for either prepaid Internet time or ordinary long distance calling.

Referring to FIG. 1, the numeral 1 generally refers to a method of providing a consumer or user with a specialized prepaid calling card which allows the recipient to make long distance calls and/or allows a limited Internet access time. In addition, the card allows the recipient to order free or low cost Internet access software. For sponsor distributed cards, the method includes collecting marketing data for the sponsor as well as featuring the sponsor's products and/or special services.

At block 2, the sponsor or a retailer distributes, either independently or along with a sponsor product, a telephone long distance calling card (not shown). For sponsor promotions, the card can be distributed free but, alternatively, the calling cards can simply be a value added consumer item. The card, for example, can take the form and size of an ordinary plastic credit card and can include printed indicia including a personal identification number (PIN). An instruction set is preferably printed on the card as well, but could be distributed in a separate paper or card. The instruction set can read, for example, as follows:

> THIS CARD ENTITLES THE BEARER TO INTERNET ACCESS SOFTWARE FOR YOUR PERSONAL COMPUTER AND TO 2 HOURS OF INTERNET ACCESS TIME. PLEASE DIAL 1-800-555-5555 AND FOLLOWING THE VERBAL INSTRUCTIONS TO ORDER YOUR INTERNET SOFTWARE. AS AN ALTERNATIVE, THIS CARD CAN BE USED FOR 30 MINUTES LONG DISTANCE CALLING WITHIN THE CONTINENTAL U.S. BY DIALLING 1-800-555-5555 AND ENTERING THE PERSONAL IDENTIFICATION NUMBER (PIN) PRINTED ABOVE AND THEN FOLLOWING THE VERBAL CALLING INSTRUCTIONS

The calling card thus provides the user with a PIN number and instructions for ordering the Internet access software. Once the Internet access software is received and loaded, the PIN number can be used either for computer access to the Internet for the allotted time period or for ordinary long distance calls or any combination of the two totalling the allotted time. Distribution of the telephone calling cards can be accomplished in a number of ways, including, but not limited to, placing them in specially marked packages of a sponsor's product and/or distributing them free, or selling them at retail through retail outlets.

Referring again to FIG. 1, at block 2, the user dials the toll free number and, at block 3, the Enhanced Entry Server (EES) gives verbal instructions on either completing the long distance call or ordering the software. For example, the instructions might be "Please Dial 1 to complete a long distance call or Dial 2 if you wish to receive the free Internet software". If the user dials "1", at block 4 the EES instructs the user to enter the PIN, verifies the entered PIN and allows the user to simply dial any allowed long distance number and receive up to 30 minutes (for example) of long distance calling time, which is timed by the EES. Alternatively, if the user is interested in receiving the Internet access software, the user dials 2 and, at block 5, the EES verifies the PIN number, queries the user for their name, address, etc., and forwards the software to the user. At block 11, the user answers the queries and receives the software, either by mail, or, optionally, by downloading to a computer. At block 12, the user installs the access software on his or her PC and initiates the toll free call and log-in procedure to the EES via the PC's modem, preferably by simply selecting a "hot button" on a menu screen. At block 13, the EES receives the protocol handshake automatically entered by the PC and verifies the user's PIN number. Also at block 13, the EES prompts the user with a customized "welcome" screen which can be personalized to the user since the user's name and address has already been associated with the PIN number in the EES database. For sponsor supplied cards, the welcome screen preferably features the sponsor's logo and other sponsor supplied information. At this point, the user is requested to register by supplying answers to queries, including typical questions such as address, age, gender, etc., and, again for sponsor provided cards, additional sponsor supplied specialized survey queries. The user provides answers to the questions and the EES collects the information and compiles a database profile for this user and activates a timer to time the user's Internet access.

Again, at block 13, the EES activates an Internet navigational software "browser" program on the user's PC. Such browser programs are widely available, and include titles such as Netscape, Mosaic, etc. For sponsor supplied cards, the EES optionally directs the browser program to directly connect (hot-link) the user to the Internet domain/Home Page of the sponsor, signified by block 14. At block 14, the user is conducted through a mandatory "guided tour" of the sponsor's domain where he or she is exposed to any promotional information, coupon retrieval options, etc., which the sponsor wants to feature. After the optional sponsor domain guided tour, at block 15, the EES returns control to the user who is now free to visit other areas of interest, either within the sponsor's domain if he or he has been hot-linked there, or elsewhere as the user is released to visit other domains or areas of interest within the Internet for the remaining time allotment provided by the calling card. At block 21, the EES provides an open link to the Internet for the remainder of the time period and also keeps a record of other domains visited by the user until the EES clock, at block 22, times out the initial period and brings up a predefined informational screen to the user. For sponsor provided cards this screen can again feature the sponsor's logo and identifying information. On this informational screen, one or more alternatives (FIGS. 2–4) are provided to the user to extend or "refresh" the Internet access time. At block 23, the user reads the informational interrupt screen and makes a decision about logging off or refreshing his allotted time period. Of course, the user can log off of the Internet at any time after registration and can reserve any remaining allotted time for later Internet access use or for ordinary long distance calling.

Figure 2:
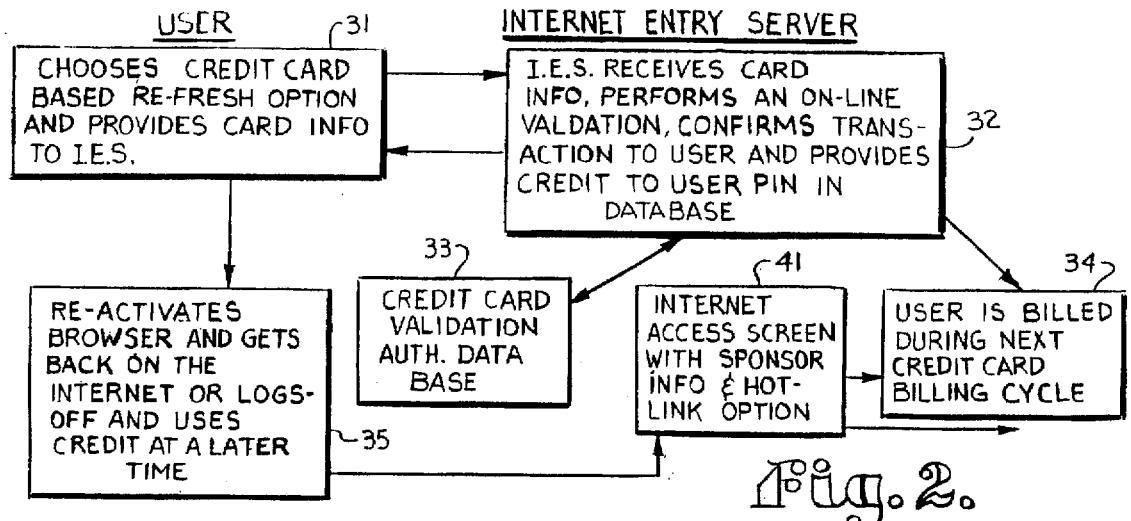
FIG. 2 is a schematic block diagram of a first option for extending a user's access to the Internet past the sponsor paid access time allotment.

Referring to FIG. 2, a block diagram of a first option for refreshing the Internet time allotment is illustrated. In this option, the user can give a credit card number to which additional Internet access time will be billed via the normal EES billing procedure. At block 31, the user chooses the credit card option from a menu of refresh options and provides his or her credit card information as well as a time purchase to the EES. At block 32, the EES receives the credit card information, performs an on-line validation from a credit card validation database (block 33), provides confirmation to the user and credits the user's PIN account with the additional time. At block 34, the user is billed during the normal credit card billing cycle. At block 35, the user reactivates the browser program and continues the Internet access or logs off and reserves the purchased time for later use. For sponsor provided cards, at block 41, each time the user reactivates the Internet browser program, a screen is presented which features the sponsor's logo or other identifying data and an option to hot-link to the sponsor's domain, possibly for no charge during the sponsor domain access.

Figure 3:
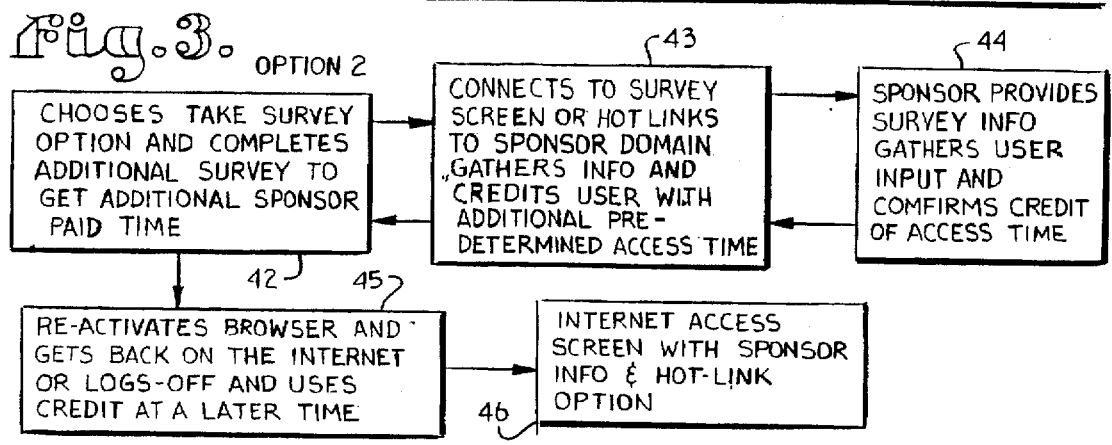
FIG. 3 is a schematic block diagram of a second option for extending a user's access to the Internet past the sponsor paid access time allotment.

FIG. 3 illustrates a block schematic diagram of a second option for refreshing the user's Internet time allotment. In this option, the user can take an additional "survey", answering additional questions and/or providing further information solicited by the sponsor, and, in return, receives an additional sponsor paid Internet time allotment. At block 42, the user chooses the Survey refresh option and, at block 43, the EES connects the user to a survey screen or, at block 44, hot-links the user to the sponsor domain where the user interactively provides the required information. Once the additional survey is complete, the sponsor, again at block 44, authorizes the additional Internet connect time allotment to the user. At block 45, the user reactivates the browser program and reaccesses the Internet or logs off and reserves the additional time for later use. At block 46, as in block 41 in FIG. 2, each time the user logs on, a sponsor tailored information screen is displayed with sponsor hot-link options.

Figure 4:
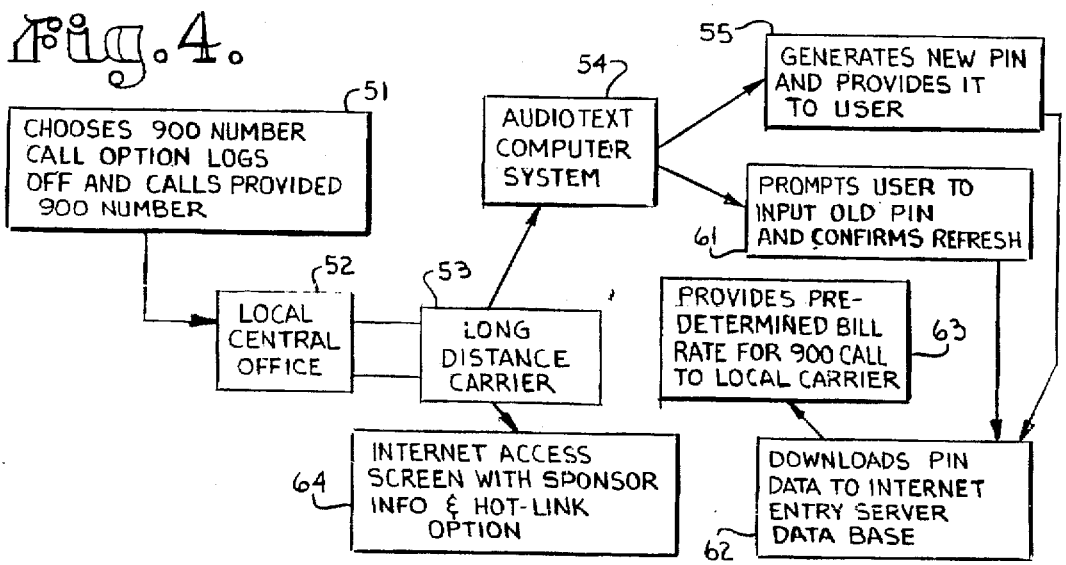
FIG. 4 is a schematic block diagram of a third option for extending a user's access to the Internet past the sponsor paid access time allotment.

FIG. 4 illustrates a block schematic diagram of a third option for refreshing the user's Internet time allotment. In this option, the user can access the EES via a "900" subscriber pay number where Internet access time will be billed through the user's telephone company 900 billing procedures. At block 51, the 900 number option is selected, whereupon the user logs off and, either immediately or at a future time, calls the assigned 900 number, using a touch-tone telephone. The 900 call proceeds through normal call channels including, at blocks 52 and 53, respectively, the user's local central office and long distance carrier, terminating at an EES linked audiotext computer system at block 54. At block 55 the EES assigns a new PIN number, or, alternatively, at block 61, prompts the entry of the old, originally assigned PIN number. At block 62, the PIN information is used to open a new account. Finally, at block 63, billing is done via normal long distance carrier and/or telephone company 900 billing procedures at a billing rate provided by the EES. Subsequent to access time being credited to user, he logs on via new or refreshed PIN. For sponsor provided cards, at block 64, Internet access screens are provided which preferably include the sponsor's logo or other information and a hot-link option to access the sponsor's domain with each log-on by the user. Again, the time consumed by the user in visiting the sponsor's domain can be provided free of charge.

The inventive promotion method allows a sponsor to accurately and efficiently target likely recipients for their Internet access promotion by eliminating those customers with no interest in, or no ability to access the Internet. In other words, the prepaid telephone calling cards are much more economical to distribute than the Internet access software, now called "sampleNet™". By first distributing the telephone calling cards, now called "phoneNet™" cards, along with instructions on how to order the Internet access software, the software is distributed only to those customers interested and equipped to use it. Furthermore, since the calling cards have an intrinsic value which is greater than a standard prepaid calling card, i.e. the long distance calling time and the Internet access time and software, they can actually be sold over retail counters, either as a stand alone consumer product, or to recoup a portion of the sponsor's costs, and/or as an incentive for retailers to participate in the sponsor's promotional program. The Enhanced Entry Server is equipped to allow either Internet access or long distance calling or any combination thereof by confirming the same PIN number. The customer who acquires and uses the Internet access software gains a free or low cost, "hassle-free" entry into the Internet while the customer who is not interested or who is not equipped to use the software gets a valuable long distance calling card.

It is to be understood that while certain forms of the present invention have been illustrated and described herein, it is not to be limited to the specific forms or arrangement of parts described and shown.

What is claimed and desired to be secured by letters patent is as follows:

1. A method of providing an enhanced value specialized prepaid calling card to a user comprising the steps of:
    a. distributing the prepaid telephone calling card with associated PIN number to the user which prepaid telephone calling card and PIN number entitles the user to log onto an Enhanced Entry Server and to access any combination of either:
        i. Internet access for a limited time; and/or
        ii. ordinary long distance calling for a limited time;
    b. prompting the user to either complete the long distance call or, alternatively, to order Internet access software which allows the user to connect a personal computer (PC) to the Enhanced Entry Server to access the Internet and gives the user a predetermined amount of pre-paid Internet access time.

2. A method as in claim 1, and, in response to the user opting to order the software, further comprising the steps of:
    a. sending the Internet access software to the user;
    b. prompting the user to log onto the Enhanced Entry Server via his or her PC using the Internet access software and to enter the PIN number;
    c. prompting the user to register with the Enhanced Entry Server as the user initially logs on; and
    d. allowing the user to access the Internet for said limited time once the user has responded to all of the queries.

3. A method as in claim 2, wherein the cards are distributed by a sponsor as a promotion, said method further comprising the step of:
    a. hot linking said user directly to an Internet domain or Home Page of the sponsor upon initial Internet access.

4. A method as in claim 3, said method further comprising the step of simultaneously collecting specialized survey data for the sponsor as the user initially logs onto the Enhanced Entry Server.

5. A method as in claim 3, and further comprising the step of:
    a. conducting said user through a guided tour of the sponsor's Internet domain; and
    b. allowing said user to browse other Internet domains only after said guided tour is concluded.

6. A method as in claim 5, and further comprising the step of:
    a. keeping a record of the said other Internet domains accessed by said user after said guided tour is concluded.

7. A method as in claim 3, and further including the step of:
    a. displaying an initial display screen each time the user accesses the Internet via said Enhanced Entry Server which display screen includes sponsor related displays or other sponsor related information.

8. A method as in claim 7, and further wherein:
    a. said initial display screen includes instructions on selecting a hot link to the sponsor Internet domain.

9. A method as in claim 8, and further wherein:
    a. access time during the hot link to the sponsor domain is paid for by the sponsor.

10. A method as in claim 2, and further comprising the step of:
    a. providing said user with one or more options to extend the Internet access time after said predetermined time period has expired.

11. A method as in claim 10, and further wherein:
    a. said options to extend include one or more of the following:

i. providing a credit card number to which further Internet access time can be charged;
ii. answering further survey questions in return for an extension of the sponsor paid Internet access time; and/or
iii. a 900 call service whereby said user accesses said Enhanced Entry Server after calling a subscriber paid 900 telephone number for further Internet access time.

12. A method of providing an enhanced value specialized prepaid calling card to a user comprising the steps of:
  a. distributing a prepaid telephone calling card with associated PIN number to the user which prepaid telephone calling card and PIN number entitles the user to log onto an Enhanced Entry Server and to access any combination of either:
    i. Internet access for a limited time; and/or
    ii. ordinary long distance calling for a limited time;
  b. prompting the user who initially contacts the Enhanced Entry Server to either complete the long distance call or to order Internet access software;
  c. sending the Internet access software to a user who orders it;
  d. prompting the user to log onto the Enhanced Entry Server via his or her PC using the Internet access software and to enter the PIN number;
  e. prompting the user to register by answering a series of queries as the user initially logs onto the Enhanced Entry Server;
  f. allowing the user to access the Internet for a predetermined pre-paid time period once the user has registered.

13. A method as in claim 12, and further comprising the step of:
  a. providing said user with one or more options to extend the Internet access time after said predetermined time period has expired.

14. A method as in claim 13, and further wherein:
  a. said options to extend include one or more of the following:
    i. providing a credit card number to which further Internet access time can be charged;
    ii. answering further survey questions in return for an extension of the sponsor paid Internet access time; and/or
    iii. a 900 call service whereby said user accesses said Enhanced Entry Server after calling a subscriber paid 900 telephone number for further Internet access time.

15. A method of providing a sponsor paid Internet connect time allotment to a user while simultaneously collecting survey data for the sponsor and promoting the sponsor's products or services comprising the steps of:
  a. distributing a prepaid telephone calling card with associated PIN number to the user which prepaid telephone calling card and PIN number entitles the user to log onto an Enhanced Entry Server and to access any combination of either:
    i. Internet access for a limited time; and/or
    ii. ordinary long distance calling for a limited time;
  b. prompting the user, upon initial contact with the Enhanced Entry Server, to either complete a long distance call or order Internet access software;
  c. sending the Internet access software to an ordering user;
  d. prompting the user to log onto the Enhanced Entry Server via his or her PC using the Internet access software;
  e. verifying the PIN number of the user upon logon;
  f. prompting the user to answer a series of queries, with the answers forming said survey data as the user initially logs onto the Enhanced Entry Server;
  g. allowing the user to access the Internet for a predetermined pre-paid time once the user has responded to all of the queries;
  h. initially hot linking said user to an Internet domain or Home Page of the sponsor upon Internet access;
  i. conducting said user through a guided tour of the sponsor's Internet domain; and
  j. allowing said user to browse other Internet sites during said pre-paid time only after said guided tour is concluded.

16. A method as in claim 15, and further comprising the step of:
  a. keeping a record of the said other Internet domains accessed by said user after said guided tour is concluded.

17. A method as in claim 15, and further comprising the step of:
  a. providing said user with one or more options to extend the Internet access time after said predetermined time period has expired.

18. A method as in claim 17, and further wherein:
  a. said options to extend include one or more of the following:
    i. providing a credit card number to which further Internet access time can be charged;
    ii. answering further survey questions in return for an extension of the sponsor paid Internet access time; and/or
    iii. a 900 call service whereby said user accesses said Enhanced Entry Server after calling a subscriber paid 900 telephone number for further Internet access time.

19. A method as in claim 17, and further including the step of:
  a. displaying an initial display screen each time the user accesses the Internet via said Enhanced Entry Server which display screen includes sponsor related displays or other sponsor related information.

20. A method as in claim 19, and further wherein:
  a. said initial display screen includes instructions on selecting a hot link to the sponsor Internet domain.

21. A method as in claim 20, and further wherein:
  (a) access time during the hot link to the sponsor domain is paid for by the sponsor.

* * * * *